United States Patent [19]

Viksne

[11] Patent Number: 5,183,873
[45] Date of Patent: Feb. 2, 1993

[54] ROOM TEMPERATURE STABLE ORGANOPOLYSILOXANE COMPOSITIONS

[75] Inventor: George J. Viksne, Delagacion Tlalpan, Mexico

[73] Assignee: Wacker Silicones Corporation, Adrian, Mich.

[21] Appl. No.: 779,748

[22] Filed: Oct. 21, 1991

[51] Int. Cl.$^5$ .............................................. C08G 77/04
[52] U.S. Cl. ...................................... 528/16; 528/24; 528/901
[58] Field of Search ........................... 528/16, 24, 901

[56] References Cited

U.S. PATENT DOCUMENTS

| | | | |
|---|---|---|---|
| 4,100,129 | 7/1978 | Beers | 528/16 |
| 4,489,199 | 12/1984 | Wengrovius | 528/16 |
| 4,921,926 | 5/1990 | Motegi et al. | 528/24 |
| 5,068,301 | 11/1991 | Okamura et al. | 528/16 |

Primary Examiner—Melvyn I. Marquis

[57] ABSTRACT

Compositions which are stable at room temperature, but when heated to an elevated temperature crosslink to form elastomeric solids comprising
 (A) organopolysiloxanes containing silicon bonded hydroxyl groups,
 (B) a crosslinking agent selected from
  (a) silanes,
  (b) partial hydrolyzates thereof and
  (c) organohydrogenpolysiloxanes and
 (C) an aluminum salt of a carboxylic acid which is a solid at room temperature.

When the compositions are heated to a temperature of at least 50° C. and more preferably from 100° to 350° C., they cure to form elastomeric solids.

16 Claims, No Drawings

ROOM TEMPERATURE STABLE ORGANOPOLYSILOXANE COMPOSITIONS

The present invention relates to room temperature stable organopolysiloxane compositions and more particularly to organopolysiloxane compositions which are stable at room temperature, but when heated to an elevated temperature crosslink to form elastomers.

BACKGROUND OF THE INVENTION

Organopolysiloxane compositions which have a long shelf life in the absence of moisture, but crosslink in the presence of moisture are described in U.S. Pat. No. 4,942,211 to Sommer et al., in which the compositions contain alpha, omega-dihydroxypolyorganosiloxanes, silanes containing alkoxy groups and SiC bonded substituted radicals containing substituents selected from amino, mercapto, acryloxy, methacryloxy, epoxy, alkyl, cyclohexyl groups, halogen atoms and cyano groups, condensation catalyst and a salt of a metal of the main and sub groups 2 of the Periodic Table with branched-chain carboxylic acids having from 5 to 15 carbon atoms.

U.S. Pat. No. 3,065,194 to Nitzsche et al., discloses a composition containing a water free mixture of essentially anhydrous hydroxyl-terminated organopolysiloxanes, an essentially anhydrous crosslinking agent of the formula

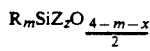

$$R_mSiZ_xO_{\frac{4-m-x}{2}}$$

in which R is a monovalent hydrocarbon radical, Z is an alkoxy or hydroxyl radical, m has an average value of from 0 to less than 2, x has an average value exceeding 2 and m+x has an average value greater than 2 and not exceeding 4, and a metallic salt of a monocarboxyic acid, such as aluminum acetyl acetonate as a catalyst. When the composition is exposed to atmospheric moisture, curing begins almost immediately.

An alkoxy functional silicone rubber composition is described in U.S. Pat. No. 4,100,129 to Beers, in which the composition contains a silanol-terminated diorganopolysiloxane base polymer, an alkoxy functional silane crosslinking agent and a titanium chelate catalyst.

A room temperature vulcanizable composition is described in U.S. Pat. No. 3,127,363 to Nitzsche et al., comprising hydroxyl terminated organopolysiloxanes, organosilicon crosslinking agents having more than two functional groups and condensation catalysts. Examples of condensation catalysts are metal soaps, metal chelates, metal salts of thiols or dithiocarbamic acids, metal oxides and organo metal compounds. The resultant compositions cure at room temperature in from 2 to 24 hours.

U.S. Pat. No. 3,070,555 to Bruner, Jr. discloses organopolysiloxane compositions containing hydroxylated organopolysiloxanes, a siloxane containing silicon-bonded hydrogen and a stannous salt of a monocarboxylic acid. When the catalyst and hydroxylated organopolysiloxane are mixed together, curing of the compositions begins in a very short time and is generally complete within 5 to 20 minutes.

In contrast to the vulcanizable compositions described above, applicant's composition is stable for long periods of time even when exposed to atmospheric moisture. Thus, applicant's composition has a long pot-life, but when heated to an elevated temperature cures rapidly to a solid. Since applicant's composition has a long pot-life, it can be employed on assembly lines where it is used over a long period of time. In addition, the components can be combined together into a single package, whereas, in the conventional compositions it was necessary to keep the compositions away from moisture or to keep the crosslinking agent or catalyst away from the base polymer until ready for use.

Therefore, it is an object of the present invention to provide a composition which is stable in the presence of moisture. Another object of the present invention is to provide a composition which has a long pot-life. Still another object of the present invention is to provide a composition which is stable in the presence of atmospheric moisture, but when heated to an elevated temperature cures to an elastomeric solid. A further object of the present invention is to provide a composition in which the components are combined in a single package. Still a further object of the present invention is to provide a composition which can be crosslinked to form elastomers without releasing corrosive, strongly acidic or basic or noxious-smelling substances. A still further object of this invention is to provide an organopolysiloxane composition which will cure at an elevated temperature to form an elastomer having desirable physical properties.

SUMMARY OF THE INVENTION

The foregoing objects and others which will become apparent from the following description are accomplished in accordance with this invention, generally speaking, by providing an organopolysiloxane composition which is stable at room temperature, but when heated to an elevated temperature cures to an elastomer comprising (A) an organopolysiloxane having silicon bonded hydroxyl groups,
(B) a crosslinking agent selected from the group consisting of
   (a) silanes of the formula

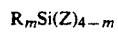

$$R_mSi(Z)_{4-m}$$

(b) partial hydrolyzates thereof and (c) organohydrogenpolysiloxanes of the average unit formula

$$R_nH\ SiO_{3-n}$$

where R is a monovalent hydrocarbon radical having from 1 to 18 carbon atoms and a substituted monovalent hydrocarbon radical having from 1 to 18 carbon atoms, Z is a hydrocarbonoxy group of the formula (OR') where R' is a monovalent hydrocarbon radical having from 1 to 10 carbon atoms or a hydrocarbonoxy-hydrocarbonoxy group of the formula (—OR"OR'), where R" is a divalent hydrocarbon radical having from 2 to 10 carbon atoms, m is an integer of from 0 to less than 2 and n is an integer greater than 0 but less than 2 and (C) an aluminum salt of a carboxylic acid which is a solid at room temperature.

DESCRIPTION OF THE INVENTION

The organopolysiloxane having silicon bonded hydroxyl groups may be represented by the formula $$HO(SiR_2O)_xH$$

where R is the same as above and x has a value of at least 2 and more preferably x has a value such that the viscosity is in the range of from 10 to 500,000 mPa·s at 25° C.

Examples of monovalent hydrocarbon radicals represented by R having from 1 to 18 carbon atoms are alkyl radicals, such as methyl, ethyl, propyl, butyl, hexyl, decyl and octadecyl radicals; alkenyl radicals such as the vinyl and allyl radicals; cycloalkyl radical, such as cyclohexyl and cycloheptyl radicals; aryl radicals, such as the phenyl, diphenyl and napthyl radicals; alkaryl radicals, such as the tolyl, xylyl and ethylphenyl radicals and the aralkyl radicals, such as the benzyl and phenylethyl radicals.

Examples of substituted monovalent hydrocarbon radicals represented by R having from 1 to 18 carbon atoms are halogenated hydrocarbon radicals such as the 3,3,3-trifluoropropyl radicals and chlorophenyl radicals and the $\beta$-cyanoalkyl radical.

Examples of preferred monovalent hydrocarbon radicals represented by R are alkyl radicals having from 1 to 4 carbon atoms such as the methyl, ethyl, propyl and butyl radicals.

It is preferred that at least 80 percent and more preferably, at least 90 percent of the R radicals be methyl radicals.

The organopolysiloxanes employed in this invention are preferably hydroxyl terminated organopolysiloxanes and can be homopolymers, i.e., only one species of siloxane unit is present, or a copolymer containing two or more different species of siloxane units. The organopolysiloxanes can also be a mixture of homopolymers and/or copolymers.

In addition to the $R_2SiO$ units, the hydroxyl containing organopolysiloxanes can also contain up to 95 mol percent of units of the formula, $R_3SiO_{\frac{1}{2}}$, $RSiO_{3/2}$ and $SiO_{4/2}$, where R is the same as above.

The organopolysiloxanes may range in viscosity from about 10 mPa·s at 25° C. up to about 500,000 mPa·s at 25° C. and more preferably from about 500 to about 100,000 mPa·s at 25° C. Thus, the organopolysiloxanes can range from thin liquids to non-flowing benzene soluble gums. Of course, the particular physical state of the polymer will vary depending upon the end use of the composition.

The organopolysiloxanes employed in this invention may also be blended with silicone resins containing units of the formula $$R_3SiO_{0.5} \text{ and } SiO_2$$

where the number ratio of $R_3SiO_{0.5}$ to $SiO_2$ units is from about 0.25:1 to about 2:1. Those are generally classified as MQ resins. Other silicone resins include resins having $R_2SiO$ and $RSiO_{3/2}$ units. These are generally known as the DT resins, where the ratio of D to T units is from about 0.05:1 to about 1:1. Silicone resins having $R_3SiO_{0.5}$ units, $R_2SiO$ units and $SiO_2$ units are known as MDQ resins, in which the $R_3SiO_{0.5}$ to $SiO_2$ units is from 0.25:1 to about 0.8:1 and the ratio $R_2SiO$ units to $SiO_2$ units can be up to about 0.1:1. In the above formulas, the R's are the same as above.

Silicone resins which may be employed generally contain from about 0.1 to 10 percent by weight of hydroxy functional groups. Other groups which may be present on the silicone resins are alkoxy functional groups, having from 1 to 4 carbon atoms, such as the methoxy, ethoxy, propoxy and butoxy groups. Generally, silicone resins which have a high proportion of hydroxy functional groups will be solid at room temperature. Depending on the molecular weight, a silicone resin having an increased number of alkoxy functional groups has a tendency to be liquid at room temperature.

If the silicone resin is a solid, it can be dissolved in an organic solvent, preferably a hydrocarbon solvent. Even though the amount of hydrocarbon solvent in which the silicone resins are dissolved can vary within extremely wide limits, satisfactory results have been obtained using solutions of the silicone resins containing from about 50 to 90 percent and more preferably from 60 to 80 percent solids.

If the silicone resin is dissolved in a solvent, then it is preferred that the silicone resin solution be combined with the organopolysiloxane and the solvent removed at an elevated temperature before mixing with the crosslinking agent and catalyst.

The silicone resins may be present in the organopolysiloxanes in an amount of from 0 to 80 percent by weight and more preferably from 10 to 70 percent by weight based on the weight of the organopolysiloxane and the silicone resin.

Crosslinking agents (B) which may be employed in the composition of this invention are (a) silanes of the formula $$R_mSi(Z)_{4-m}$$

and (b) partial hydrolyzates thereof, in which R is the same as above and Z is a hydrocarbonoxy radical of the formula (OR') or a hydrocarbonoxy-hydrocarbonoxy radical of the formula (—OR"OR'), where R' is a monovalent hydrocarbon radical having from 1 to 10 carbon atoms, R" is a divalent hydrocarbon radical having from 2 to 10 carbon atoms and m is an integer of from 0 to less than 2.

Examples of hydrocarbon radicals represented by R' are alkyl radicals such as methyl, ethyl, propyl, butyl, pentyl, hexyl, heptyl, oxtyl and decyl radicals and aryl radicals such as the phenyl radical.

Examples of divalent hydrocarbon radicals represented by R" are ethylene, propylene, butylene, pentylene, hexylene, octylene and decylene radicals.

Examples of hydrocarbonoxy radicals having from 1 to 10 carbon atoms which are represented by the radical (OR') are methoxy, ethoxy, n-propoxy, isopropoxy, butoxy, hexyloxy, heptyloxy, octyloxy and phenoxy groups.

Hydrocarbonoxy-hydrocarbonoxy groups represented by the formula (—OR"OR') are for example the methoxy ethyleneoxy group, ethoxy ethyleneoxy group, propoxy ethyleneoxy group, methoxy propyleneoxy group, butoxy ethyleneoxy group, methoxy butyleneoxy group and the like.

Examples of crosslinking agent (B) represented by (a) above are tetraethoxysilane, methyltrimethoxysilane, methyltriethoxysiane, methyltripropoxysilane, methyltributoxysilane, ethyltrimethoxysilane, ethyltriethoxysilane, ethyltri-n-propoxysilane propyltriethoxysilane, propyltri-n-propoxysilane, butyltrimethoxysilane, butyltriethoxysilane, isobutyltrimethoxysilane, isobutyltriethoxysilane, n-hexyltrimethoxysilane, cyclohexyltrimethoxysilane, benzyltrimethoxysilane, phenyltrimethoxysilane, phenyltriethoxysilane, octyltrimethoxysilane, octyltriethoxysilane, lauryltrimethoxysilane, 2-ethylhexyltrimethoxysilane, decyltrimethoxysilane, dodecyltrimethoxysilane, tetradecyltriethoxysilane, hexadecyltriethoxysilane, octadecyltriethoxysilane as well as mixtures of the above silanes and mixtures of the above silanes with silanes such as diethydiethoxysilane, dimethyldipropoxysilane, di-isopropyldi-isopropoxysilane, dibutyldimethoxysilanes, di-isobutyldimethoxysilane, octylmethyldi-isopropoxysilane and the like.

Other crosslinking agents (B) which may be employed are (b) partial hydrolyzates of silanes of the formula

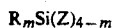
$$R_mSi(Z)_{4-m}$$

having up to about 10 silicon atoms, where R, Z and m are the same as above.

Examples of partial hydrolyzates of the silanes are hexamethoxydisiloxane, dimethyltetraethoxydisiloxane, dimethyldiphenyl-hexylethoxytetrasiloxane.

The partial hydrolyzates (b) may be employed alone or in admixture with the silanes (a).

The silanes, partial hydrolyzates or mixtures thereof may be employed in an amount of from about 0.2 to about 15 parts by weight and more preferably from about 1 to 10 parts by weight per 100 parts by weight of the organopolysiloxane (A).

Any organopolysiloxanes containing Si-bonded hydrogen, which could have been used heretofore in combination with an organosilicon compound having Si-bonded hydroxyl groups to prepare organopolysiloxane elastomers may be used in the process of this invention.

The organopolysiloxanes (c) containing Si-bonded hydrogen may be represented by the formula

$$R_nHSiO_{3-n}$$

where R is the same as above, except for radicals having aliphatic unsaturation, and n is an integer greater than 0, but less than 2. It is preferred that the organopolysiloxanes containing Si-bonded hydrogen have on the average at least 3 Si-bonded hydrogen atoms per molecule. Furthermore, it is preferred that they contain at least 0.01 percent by weight and more preferably at least 1 percent by weight but no more than about 1.8 percent by weight of Si-bonded hydrogen. The organopolysiloxanes having Si-bonded hydrogen may also be linear, cyclic or branched. They may also contain siloxane units such as $RSiO_{3/2}$, $R_2SiO$, $R_3SiO_{\frac{1}{2}}$, RHSiO, $HSiO_{3/2}$, $R_2HSiO_{\frac{1}{2}}$, $H_2SiO$, $RH_2SiO_{\frac{1}{2}}$ and $SiO_{4/2}$, with the proviso that for each molecule at least one and more preferably three R radicals be present and that at least one and more preferably at least three Si-bonded hydrogen atoms be present.

The organopolysiloxanes having Si-bonded hydrogen may for example be cyclic methylhydrogenpolysiloxanes such as 2,4,6,8-tetramethylcyclotetrasiloxane, trimethylsiloxy endblocked methylhydrogenpolysiloxane copolymers of trimethylsiloxane, dimethylsiloxane and methylhydrogensiloxane units, copolymers of dimethylhydrogensiloxane and methylhydrogensiloxane units, as well as copolymers of dimethylhydrogensiloxane, dimethylsiloxane and methylhydrogensiloxane units.

The viscosity of the organopolysiloxane having Si-bonded hydrogen may range from about 10 to 1000 mPa·s and more preferably from about 10 to about 500 mPa·s at 25°.

It is preferred that the organopolysiloxane having Si-bonded hydrogen be employed in an amount of from about 0.5 to 50 parts by weight for each 100 parts by weight of organopolysiloxane (A).

Curing of the compositions of this invention is brought about by combining the organopolysiloxane (A), the crosslinking agent (B) and a catalyst (C) comprising an aluminum salt of a carboxylic acid which is a solid at room temperature and thereafter heating the resultant composition to an elevated temperature. Any carboxylic acid salt of aluminum may be employed in this invention provided the aluminum salt is a stable solid at room temperature. Preferably the carboxylic acid radical contains from 8 to 18 carbon atoms.

Specific examples of salts which are operative in this invention are aluminum 2-ethylhexoate, aluminum stearates such as aluminum distearate, aluminum hydroxy stearate, aluminum monostearate, aluminum tristearate, aluminum octoate, aluminum naphthenate, aluminum oleate, aluminun palmitate and aluminum triricinolate.

In general, the amount of aluminum salt of a carboxylic acid employed may range from about 0.1 to about 10 parts by weight per 100 parts by weight of the organopolysiloxane (A). A mixture of two or more of the aluminum salts of a carboxylic acid may be employed, if desired. In general, the catalyst concentration preferably ranges from about 0.2 to about 5 parts by weight per 100 parts by weight of organopolysiloxane (A).

In addition to the organopolysiloxane (A), crosslinking agents (B) and an aluminum salt of a carboxylic acid (C), the composition of this invention may also contain a peroxide compound (D). Any peroxide compound which could have been used heretofore for crosslinking diorganopolysiloxanes may be used in the composition of this invention. Examples of such peroxide compounds are acyl peroxides, for example dibenzoylperoxide, bis-(4-chlorobenzoyl)-peroxide and bis-(2,4-dichlorobenzoyl)-peroxide; alkyl peroxides and aryl peroxides, such as di-tert-butylperoxide and dicumylperoxide; perketals, such as 2,5-bis-(tert-butylperoxy)-2,5-dimethylhexane as well as peresters, such as diacetylperoxydicarbonate, tert-butylperbenzoate and tert-butyl-peroxyisopropylcarbonate.

It is preferred that if the peroxide compounds are employed, that they be employed in an amount of from 0.1 to about 5 parts by weight and more preferably from about 0.2 to about 3 parts by weight per 100 parts by weight of the organopolysiloxane (A).

Also, it is possible to employ additional substances, which have been or could have been used heretofore in the preparation of organopolysiloxane elastomers in the composition of this invention. Such additional substances which may be employed are, for example reinforcing fillers such as silicon dioxide having a surface area of at least 50 m²/g, such as, for example quartz meal, diatomaceous earth, siliceous chalk, such as Neuburg chalk, calcium silicate, zirconium silicate and calcium carbonate, for example in the form of ground chalk and calcinated aluminum silicate. Fibrous fillers such as asbestos and/or glass fibers may also be employed. The amount of filler may range from 10 to 300 or more parts by weight per 100 parts by weight of organopolysiloxane (A). Other substances which may be employed are pigments, soluble dyes, agents which influence electrical properties, such as conductive carbon black, graphite, corrosion inhibitors, oxidation inhibitors, heat stabilizers, flame proofing materials, agents which impede efflorescence and materials which serve to reduce deflection under constant pressure.

Examples of carbon blacks which may be employed in the composition of this invention are furnace type carbon black and acetylene black. A commercial form of furnace type carbon black is Ketjenblack ™ EC and a commercial form of acetylene black is Shawinigan ® acetylene black.

The carbon black preferably has a surface area of from 40 to 1,500 m²/g and more preferably a surface area of from 100 to 1,000 m²/g.

When it is desired to form organopolysiloxane foams, it may be desirable to add organic blowing agents to the compositions of this invention. Examples of suitable organic blowing agents are azoisobutyric acid nitrile, dinitrosopentamethylenetetramine, benzenesulfonic acid hydrazide, N,N'-dinitroso-N, N'-dimethyltereph-thalic acid diamide, P,P'-oxybis-(benzene-sulfonic acid hydrozide), terephthalic acid azide or azodicarbonamide.

The composition of this invention is preferably cured at the pressure of the surrounding atmosphere, e.g., at 1 bar or at about 1 bar. However, if desired, lower pressures or higher pressures may be employed as well.

The composition of this invention can be cured at an elevated temperature in closed or open systems in thick or thin sections and under pressure and at atmospheric pressure with equal ease merely by the application of heat above about 50° C. It is preferred however, that the composition be heated to a temperature of at least 50° C. and more preferably to a temperature of from about 100° C. to about 350° C.

The organopolysiloxane elastomers obtained from the compositions of this invention may be used for all purposes for which organopolysiloxane elastomers have been used heretofore. For example, they may be used as sealants, in the formation of protective coatings, such as those exposed to fresh or sea water, non-slip coatings, moldings, insulation of electrical or electronic equipment, thermal insulation, as sound-proofing in buildings, vehicles, ships and aircraft.

One of the advantages of the compositions of this invention is that they are stable for long periods of time even when exposed to atmospheric moisture at room temperature. Another advantage of the compositions of this invention is that they can be combined into a single package and used at a later date.

In the following examples all parts are by weight unless otherwise specified:

EXAMPLE 1

About 100 parts of a hydroxyl terminated dimethyl-polysiloxane having a viscosity of about 4,000 mPa·s at 25° C. are mixed with 35 parts of diatomaceous earth, 20 parts of methyltriethoxysilane and 0.5 part of aluminum octoate. The resultant mixture is stable in atmospheric moisture for 5 days at room temperature, but when heated to a temperature of 200° C. for 10 minutes, it cures to an elastomeric solid.

EXAMPLE 2

To about 100 parts of a polydimethylsiloxane having terminal hydroxyl groups and a viscosity of 5,000 mPa·s at 25° C. are added 50 parts of fumed silica, 5 parts of methyltriisopropoxysilane and 1.5 parts of aluminum stearate. The resultant composition is stable for 5 days at room temperature when exposed to atmospheric moisture, but cures to an elastomer when heated for 10 minutes at 200° C.

EXAMPLE 3

To about 100 parts of a polydimethylsiloxane having terminal hydroxyl groups and a viscosity of 10,000 mPa·s at 25° C. are added 50 parts of fumed silica, 4 parts of methyltributoxysilane and 1.5 parts of aluminum 2-ethylhexoate. The resultant composition is stable at room temperature in the presence of atmospheric moisture, but when heated to 200° C. for 10 minutes cures to an elastomer.

EXAMPLE 4

To 100 parts of a polydimethylsiloxane having terminal hydroxyl groups and a viscosity of 4,000 mPa·s at 25° C. are added 50 parts of diatomaceous earth, 2 parts of ethylsilicate 40 (a mixture of polysilicates having 40 percent silica) and 2 parts of aluminum octoate. The resultant composition is stable for 5 days when exposed to atmospheric moisture at room temperature; however, when heated for 10 minutes at 200° C., it cures to an elastomeric solid.

EXAMPLE 5

To 100 parts of a polydimethylsiloxane having terminal hydroxyl groups and a viscosity of 4,000 mPa·s at 25° C. are added 50 parts of fumed silica, 5 parts of a methylethoxysilane oligomer (available as "Trasil" from Wacker-Chemie GmbH) and 1.0 part of aluminum octoate. The resultant composition is stable for 5 days at room temperature in atmospheric moisture, but cures to an elastomer in 10 minutes when heated to 200° C.

EXAMPLE 6

To 100 parts of a polydimethylsiloxane having terminal hydroxyl groups and a viscosity of 4,000 mPa·s at 25° C. are added 75 parts of carbon black (Shawinigan ® acetylene black), 5 parts of propyltriethoxysilane and 1.0 part of aluminum triricinolate. The resultant mixture is stable in atmospheric moisture for at least 3 days at room temperature, but when heated to 200° C. for 10 minutes, it cures to an elastomeric solid.

COMPARISON EXAMPLE A

The procedure of Example 1 is repeated except that 0.5 part of tetrabutyltitanate is substituted for the aluminum octoate. The resultant mixture begins to cure within one hour when exposed to atmospheric moisture.

COMPARISON EXAMPLE B

The procedure of Example 4 is repeated except that 2 parts of dibutyltindilaurate is substituted for the aluminum octoate. The resultant mixture begins to cure within 30 minutes after the components are mixed.

EXAMPLE 7

To about 100 parts of a polydimethylsiloxane having terminal hydroxyl groups and a viscosity of 5,000 mPa·s at 25° C. are added 50 parts of fumed silica, 5 parts of methyltriethoxysilane, 1.0 part of aluminum octoate and 1.5 parts of 2,-4 dichlorobenzoyl peroxide. The resultant composition is stable in the presence of atmospheric moisture. When the composition is heated to 200° C. for 10 minutes it cures to an elastomeric solid. The resultant elastomer appeared dry on its surface.

EXAMPLE 8

To about 100 parts of a polydimethylsiloxane having terminal Si-bonded hydroxyl groups and a viscosity of about 4,000 mPa·s at 25° C. are added 35 parts of a pyrogenically produced silicon dioxide, 2 parts of aluminum octoate and 5 parts of a trimethylsiloxy end-blocked methylhydrogenpolysiloxane which has a viscosity of about 40 mPa·s at 25° C. and about 1.6 percent of Si-bonded hydrogen. After the ingredients have been mixed, the resultant composition is exposed to atmospheric moisture at 25° C. for 5 days. No curing is observed on the surface of the composition. When the composition is applied to a substrate at a thickness of about 200 mils and heated to 200° C. for 10 minutes, it cures to an elastomeric solid with a slight amount of foaming.

EXAMPLE 9

The procedure of Example 8 is repeated except that 2 parts of aluminum 2-ethylhexoate was substituted for the aluminum octoate. The resultant composition is stable for 3 days in the presence of atmospheric moisture at 25° C. When heated to 200° C. for 10 minutes, it cures to an elastomeric solid.

EXAMPLE 10

The procedure of Example 8 is repeated except that 3 parts of aluminum stearate is substituted for the aluminum octoate. The resultant composition is stable for at least 3 days when exposed to atmospheric moisture at 25° C. When the composition is heated to 200° C. for 10 minutes, it cures to an elastomeric solid.

EXAMPLE 11

The procedure of Example 8 is repeated except that 50 parts of a polydimethylsiloxane having terminal Si-bonded hydroxyl groups and a viscosity of about 2000 mPa·s at 25° C. and 50 parts of a silicone resin in a solution of xylene having $(CH_3)_3SiO_{0.5}$ units to $SiO_2$ units of about 0.5 to 1 are substituted for 100 parts of the polydimethylsiloxane.

The silicone resin solution is prepared by dissolving 50 parts of the silicone resin in xylene to provide a solution containing about 70 percent solids. The silicone resin solution is mixed with the polydimethylsiloxane having terminal Si-bonded hydroxyl groups and heated at about 55° C. for about 5 hours at a reduced pressure of about 20 millimeters.

When the resultant compositions are mixed with a methylhydrogenpolysiloxane crosslinking agent and the aluminun catalyst, it is stable for at least 3 days in the presence of moisture When the composition is heated to a temperature of about 200° C. for 10 minutes, it cures to a solid.

What is claimed is:

1. A composition which is stable at room temperature, but when heated to an elevated temperature cures to an elastomeric solid which comprises (A) an organopolysiloxane having silicon bonded hydroxyl groups, (B) a crosslinking agent selected from the group consisting of
(a) a silane of the formula $$R_mSi(Z)_{4-m},$$

(b) partial hydrolyzates of silane (a) and (c) an organohydrogenpolysiloxane of the average unit formula $$R_nHSiO_{3-n}$$

where R is selected from the group consisting of a monovalent hydrocarbon radical having from 1 to 18 carbon atoms and a substituted monovalent hydrocarbon radical having from 1 to 18 carbon atoms, Z is selected from the group consisting of a hydrocarbonoxy group of the formula (—OR') and a hydrocarbonoxy-hydrocarbonoxy group of the formula (—OR"OR'), where R' is a monovalent hydrocarbon radical having from 1 to 10 carbon atoms, R" is a divalent hydrocarbon radical having from 2 to 10 carbon atoms, m is an integer of from 0 to less than 2 and n is an integer greater than 0, but less than 2 and (C) an aluminum salt of a carboxylic acid having from 8 to 18 carbon atoms which is solid at room temperature.

2. The composition of claim 1, wherein the organopolysiloxane (A) is represented by the formula $$HO(SiR_2O)_xH$$

where R is selected from the group consisting of a monovalent hydrocarbon radical having from 1 to 18 carbon atoms and a substituted monovalent hydrocarbon radical having from 1 to 18 carbon atoms and x has a value of at least 2.

3. The composition of claim 1, wherein the organohydrogenpolysiloxane has a viscosity of from about 10 to 1000 mPa·s at 25° C.

4. The composition of claim 1, wherein the crosslinking agent (B) is selected from the group consisting of (a) a silane of the formula $$R_mSi(Z)_{4-m}$$

where R is selected from the group consisting of a monovalent hydrocarbon radical having from 1 to 18 carbon atoms and a substituted monovalent hydrocarbon radical having from 1 to 18 carbon atoms, Z is selected from the group consisting of a hydrocarbonoxy group of the formula (—OR') and a hydrocarbonoxy-hydrocarbonoxy group of the formula (—OR"OR'), where R' is a monovalent hydrocarbon radical having from 1 to 10 carbon atoms and R" is a divalent hydrocarbon radical having from 1 to 10 carbon atoms and m is an integer of from 0 to less than 2 and (b) a partial hydrolyzate of said silane having up to 10 silicon atoms.

5. The composition of claim 1, wherein the composition also contains an organic peroxide.

6. The composition of claim 4, wherein the composition also contains an organic peroxide.

7. The composition of claim 1, wherein the crosslinking agent (B) is an organohydrogenpolysiloxane (c) of the average unit formula $$R_nHSiO_{3-n}$$

where R is selected from the group consisting of a monovalent hydrocarbon radical having from 1 to 18 carbon atoms and a substituted monovalent hydrocarbon radical having from 1 to 18 carbon atoms and n is an intger greater than 0, but less than 2.

8. The composition of claim 1, wherein the organohydrogenpolysiloxane has a viscosity of from, 10 to 1000 mPa·s at 25° C.

9. The composition of claim 7, wherein the aluminum salt of a carboxylic acid is aluminum octoate.

10. The composition of claim 1, wherein the organopolysiloxane (A) is a mixture containing an organopolysiloxane having silicon bonded hydroxyl groups and a silicone resin containing from 0.1 to 10 percent by weight of hydroxyl groups.

11. A process for preparing a composition which is stable at room temperature, but when heated to an elevated temperature cures to elastomeric solid which comprises mixing (A) an organopolysiloxane having silicon bonded hydroxyl groups with (B) a crosslinking agent selected from the group consisting of (a) a silane of the formula $$R_mSi(Z)_{4-m}.$$

(b) partial hydrolyzates of silane (a) and
(c) an organohydrogenpolysiloxane of the average unit formula $$R_nHSiO_{3-n}$$

where R is selected from the group consisting of a monovalent hydrocarbon radical having from 1 to 18 carbon atoms and a substituted monovalent hydrocarbon radical having from 1 to 18 carbon atoms, Z is selected from the group consisting of a hydrocarbonoxy group of the formula (—OR') and a hydrocarbonoxy-hydrocarbonoxy group of the formula (—OR"OR'), where R' is a monovalent hydrocarbon radical having from 1 to 10 carbon atoms, R" is a divalent hydrocarbon radical having from 2 to 10 carbon atoms, m is an integer of from 0 to less than 2 and n is an integer greater than 0, but less than 2 and (C) an aluminum salt of a carboxylic acid having from 8 to 18 carbon atoms which is solid at room temperature.

12. The process of claim 11, wherein the crosslinking agent (B) is selected from the group consisting of (a) a silane of the formula $$R_mSi(Z)_{4-m}$$

where R is selected from the group consisting of a monovalent hydrocarbon radical having from 1 to 18 carbon atoms and a substituted monovalent hydrocarbon radical having from 1 to 18 carbon atoms, Z is selected from the group consisting of a hydrocarbonoxy group of the formula (—OR') and a hydrocarbonoxy-hydrocarbonoxy group of the formula (—OR"OR'), where R' is a monovalent hydrocarbon radical having from 1 to 10 carbon atoms and R" is a divalent hydrocarbon radical having from 1 to 10 carbon atoms and m is an integer of from 0 to less than 2 and (b) a partial hydrolyzate of said silane having up to 10 silicon atoms.

13. The process of claim 11, wherein the crosslinking agent (B) is an organohydrogenpolysiloxane of the average unit formula $$R_nHSiO_{3-n}$$

where R is selected from the group consisting of a monovalent hydrocarbon radical having from 1 to 18 carbon atoms and a substituted monovalent hydrocarbon radical having from 1 to 18 carbon atoms and n is an integer greater than 0, but less than 2.

14. The process of claim 12, wherein the organopolysiloxane (A) is represented by the formula $$HO(SiR_2O)_xH$$

where R is selected from the group consisting of a monovalent hydrocarbon radical having from 1 to 18 carbon atoms and a substituted monovalent hydrocarbon radical having from 1 to 18 carbon atoms and x has a value of at least 2.

15. An elastomeric solid which is obtained by heating the composition of claim 1 to a temperature of at least 50° C.

16. A process for preparing an elastomeric solid which comprises heating the composition of claim 1 to a temperature of at least 50° C.

* * * * *